United States Patent [19]

Kayane et al.

[11] Patent Number: 4,841,031
[45] Date of Patent: Jun. 20, 1989

[54] REACTIVE DYE HAVING BOTH MONOCHLOROTRIAZINYL AND VINYLSULFONE TYPE REACTIVE GROUPS

[75] Inventors: Yutaka Kayane, Sakai; Katsumasa Otake, Nara; Yasuo Tezuka, Ibaraki, all of Japan

[73] Assignee: Sumitomo Chemical Company, Limited, Osaka, Japan

[21] Appl. No.: 648,349

[22] Filed: Sep. 7, 1984

Related U.S. Application Data

[63] Continuation of Ser. No. 322,688, Nov. 18, 1981, abandoned.

[30] Foreign Application Priority Data

May 6, 1981 [JP]  Japan ................................ 56-68727
May 6, 1981 [JP]  Japan ................................ 56-68728

[51] Int. Cl.$^4$ .................. C09B 62/085; C09B 62/45; C09B 62/53; D06P 1/38
[52] U.S. Cl. .................. 534/638; 534/617; 534/642
[58] Field of Search .......................... 260/153, 146 T; 534/638

[56] References Cited

U.S. PATENT DOCUMENTS

| | | | |
|---|---|---|---|
| 3,223,470 | 12/1965 | Boederer et al. | 260/163 X |
| 3,455,897 | 7/1969 | Barben | 260/146 T |
| 3,591,577 | 7/1971 | Moiso et al. | 260/153 |
| 4,341,699 | 7/1982 | Tezuka et al. | 260/153 |

FOREIGN PATENT DOCUMENTS

| | | | |
|---|---|---|---|
| 2437426 | 4/1980 | France | 260/153 |
| 410237 | 10/1966 | Switzerland | 260/153 |
| 2026527 | 2/1980 | United Kingdom | 260/146 T |
| 2034343 | 6/1980 | United Kingdom | 260/153 |

Primary Examiner—Floyd D. Nigel
Attorney, Agent, or Firm—Stevens, Davis, Miller & Mosher

[57] ABSTRACT

A novel reactive monoazo dye, capable of giving cellulose fiber materials a deep orange to scarlet color and superior in build-up and chlorine fastness properties, represented by a free acid of the formula,

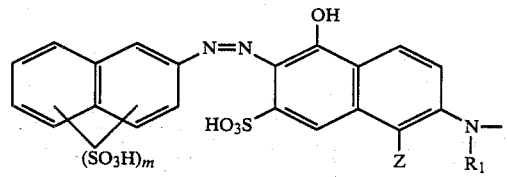

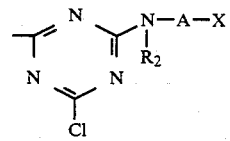

wherein $R_1$ is hydrogen, methyl or ethyl; $R_2$ is an alkyl having 1 to 4 carbons that is either unsubstituted or substituted with hydroxy, cyano, alkoxy, halogen, carboxy, alkoxycarbonyl or sulfonic acid; Z is hydrogen or sulfonic acid; A is phenylene and is either unsubstituted or substituted with 1 or 2 substituents selected from the group consisting of methyl, ethyl, methoxy, ethoxy, chlorine, bromine and sulfonic acid, or natphthylene that is either unsubstituted or substituted with sulfonic acid; X is —SO$_2$CH=CH$_2$ or —SO$_2$CH$_2$CH$_2$Y in which Y is a group that is splittable by alkalis; and m is an integer of 1 to 3.

6 Claims, No Drawings

REACTIVE DYE HAVING BOTH MONOCHLOROTRIAZINYL AND VINYLSULFONE TYPE REACTIVE GROUPS

This application is a continuation of application Ser. No. 322,688, filed Nov. 18, 1981, now abandoned.

The present invention relates to novel reactive monoazo dyes, their production and dyeing of cellulose fiber materials with them.

It is well known that dyes having a β-sulfatoethylsulfonyl group or so-called vinylsulfone type reactive dyes are used for dyeing cellulose fiber materials. However, products dyed with orange to scarlet azo reactive dyes of this type are not deep in color because of the poor build-up property of the dyes. In addition, the dyed products are generally low in chlorine fastness so that they often experience discoloration due to the chlorine in city water supplies.

Dyes having a monochlorotriazinyl group are also known. Generally, however, these reactive dyes require high temperatures for dyeing and lack exhaustion dyeing ability. Accordingly, they are only used for printing. Besides, the products dyed with dyes of this type are low in acid stability. Thus, dyes of this type are not always satisfactory in practical use. For example, the following dyes are disclosed in U.S. Pat. No. 3,223,470:

However, these dyes are not satisfactory in solubility, build-up property, washing-off property or the like.

For the reasons described above, the applicants have undertaken extensive studies in order to obtain orange to scarlet reactive dyes that are superior in build-up property and chlorine fastness. As a result of these studies, the applicants have found that specified monoazo dyes having as reactive groups both β-sulfatoethylsulfonyl and monochlorotriazinyl groups give dyed products of deep orange to scarlet color that are superior in chlorine fastness.

The present invention provides a compound represented by a free acid of the formula (I),

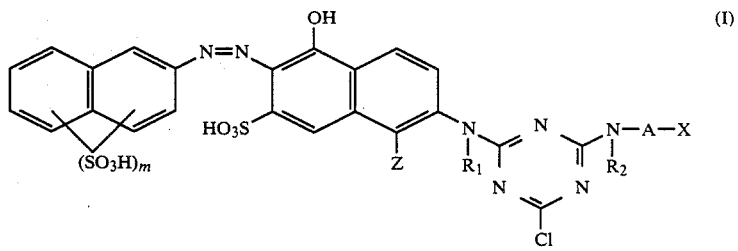

(I)

wherein $R_1$ is a hydrogen atom, or a methyl or ethyl group; $R_2$ is an alkyl group having 1 to 4 carbon atoms which is unsubstituted or substituted with a hydroxy, cyano, alkoxy, halogen, carboxy, alkoxycarbonyl or sulfonic acid group; Z is a hydrogen atom or a sulfonic acid group; A is a phenylene residue unsubstituted or substituted with 1 or 2 substituents selected from methyl, ethyl, methoxy, ethoxy, chlorine, bromine and sulfonic acid groups, or a naphthylene residue unsubstituted or substituted with one sulfonic acid group; X is $-SO_2CH=CH_2$ or $-SO_2CH_2CH_2Y$ in which Y is a group which is splittable by alkalis; and m is an integer of 1 to 3.

Among the compounds (I), prefered are those having the following formula,

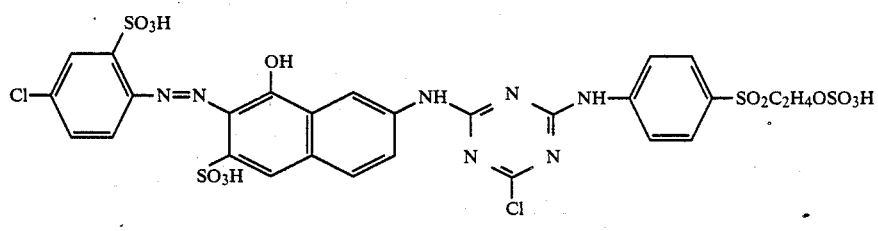

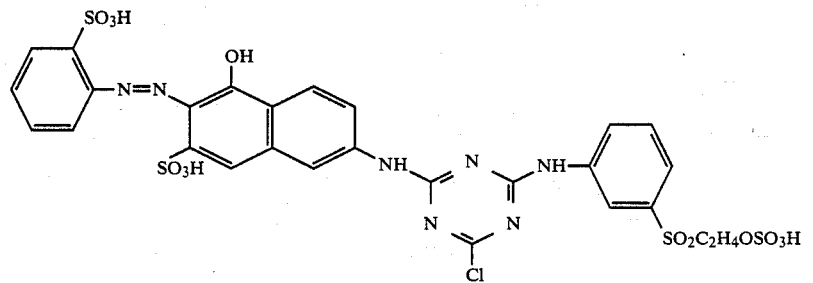

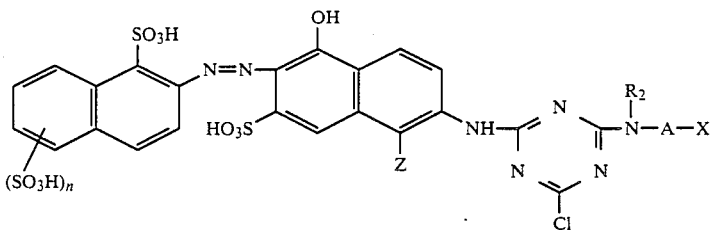

wherein $R_2$, A, X and Z are as defined above, and n is 0 or 1, more specifically, those having the following formula,

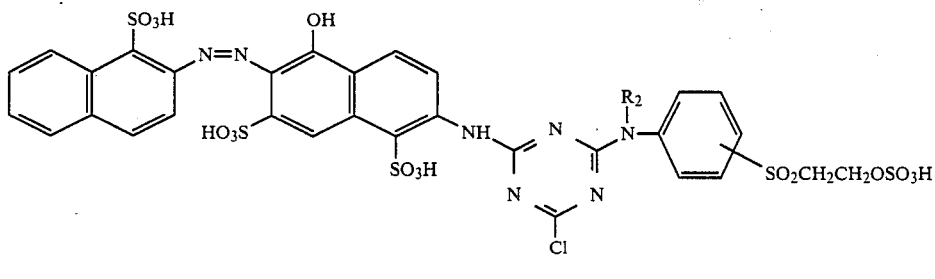

wherein $R_2$ is as defined above, preferably methyl, ethyl, n-propyl or 2-hydroxyethyl groups.

Specific examples of Y when X in the formula (I) is —$SO_2CH_2CH_2Y$, include sulfate, phosphate and acetate groups and halogen atoms.

The present invention also provides a method for producing the compound represented by the formula (I), which comprises (1) subjecting cyanuric chloride to first-step condensation with a monoazo compound of the formula (IV),

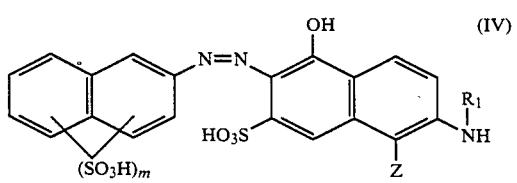  (IV)

wherein $R_1$, Z and m are as defined above, and then to second-step condensation with a compound of the formula (V),

  (V)

wherein $R_2$, A and X are as defined above, or (2) subjecting cyanuric chloride to first-step condensation with the compound of the formula (V) and then to second-step condensation with the monoazo compound of the formula (IV), or (3) condensing cyanuric chloride with a compound of the formula (III),

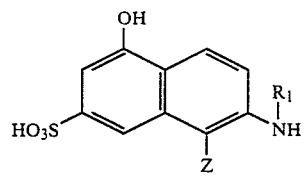

wherein $R_1$ and Z are as defined above, and the compound of the formula (V) in optional order to obtain a monochlorotriazinyl compound of the formula (VI),

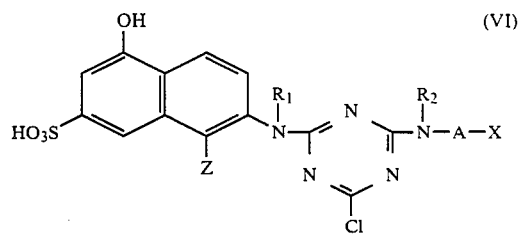  (VI)

wherein $R_1$, $R_2$, Z, A and X are as defined above, and then coupling the compound (VI) with a diazonium salt of an aromatic amine of the formula (II),

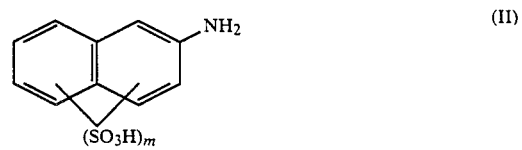  (II)

wherein m is as defined above, or (4) subjecting cyanuric chloride to first-step condensation with the compound of the formula (III), coupling the resulting compound with the diazonium salt of the aromatic amine of the formula (II) to obtain a monoazo compound of the formula (VII),

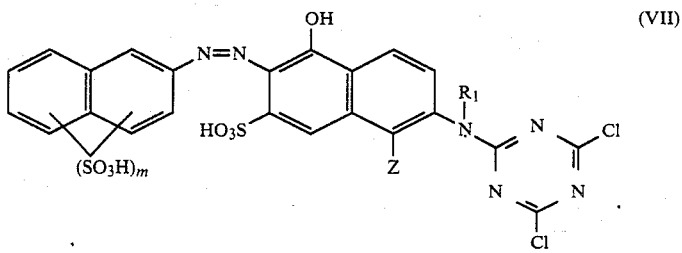

(VII)

wherein $R_1$, Z and m are as defined above, and condensing the compound (VII) with the compound of the formula (V), or (5) condensing cyanuric chloride with the monoazo compound of the formula (IV) and a compound of the formula (VIII),

(VIII)

wherein $R_2$ and A are as defined above, in optinal order to obtain a monochlorotriazinyl compound of the formula (IX),

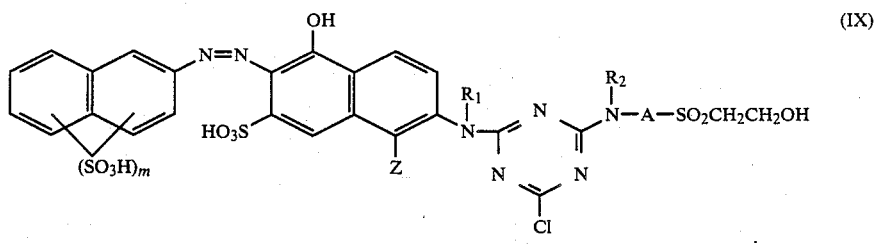

(IX)

wherein $R_1$, $R_2$, A, Z and m are as defined above, which is then esterified with an acid, or (6) condensing cyanuric chloride with compounds of the formulae (III) and (VIII) in optional order, and coupling the resulting compound with the diazonium salt of the aromatic amine of the formula (II) to obtain the monoazo compound of the formula (IX) which is then esterified with an acid.

The method for the production of the monoazo compound of the formula (I) is illustrated in more detail as follows.

As the compound of the formula (II), the following compounds are exemplified:
2-Aminonaphthalene-1-sulfonic acid
2-Aminonaphthalene-5-sulfonic acid
2-Aminonaphthalene-6-sulfonic acid
2-Aminonaphthalene-7-sulfonic acid
2-Aminonaphthalene-8-sulfonic acid
2-Aminonaphthalene-1,4-disulfonic acid
2-Aminonaphthalene-1,5-disulfonic acid
2-Aminonaphthalene-1,7-disulfonic acid
2-Aminonaphthalene-1,5,7-trisulfonic acid
2-Aminonaphthalene-3,6-disulfonic acid
2-Aminonaphthalene-3,8-disulfonic acid
2-Aminophthalene-4,8-disulfonic acid
2-Aminonaphthalene-5,7-disulfonic acid
2-Aminonaphthalene-6,8-disulfonic acid
2-Aminonaphthalene-3,6,8-trisulfonic acid A substituent, $R_2$, in the compound of the formula

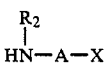

(V)

includes, for example, methyl, ethyl, n-propyl, n-butyl, iso-propyl, iso-butyl, sec-butyl, tert-butyl, hydroxymethyl, 2-hydroxyethyl, 2-hydroxypropyl, 3-hydroxypropyl, 2-hydroxybutyl, 4-hydroxybutyl, 1-methyl-2-hydroxypropyl, cyanomethyl, cyanoethyl, methoxymethyl, 2-methoxyethyl, 3-methoxypropyl, ethoxymethyl, 2-ethoxyethyl, chloromethyl, 2-chloroethyl, 3-chloropropyl, 4-chlorobutyl, carboxymethyl, 2-carboxyethyl, 2-methoxycarbonylethyl, 2-ethoxycarbonylmethyl, sulfomethyl and 2-sulfoethyl groups.

The residue represented by A in the formula (V) includes, for example

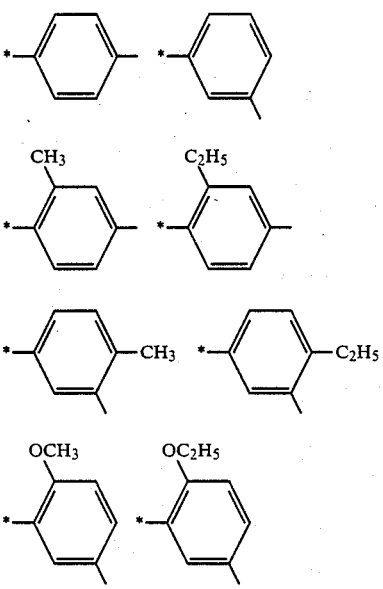

-continued

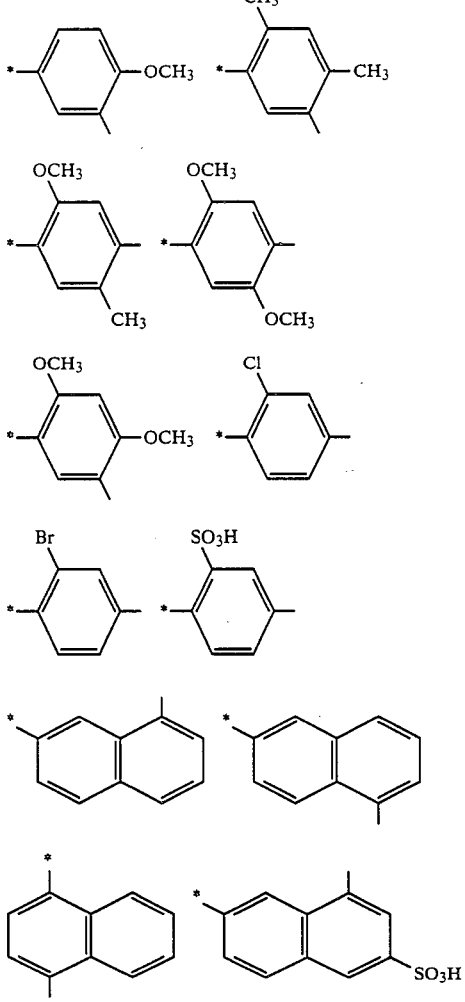

In carrying out the method of the present invention, (1) the aromatic amine of the formula (II) is diazotized at −10° to 40° C. in an aqueous medium and coupled with the compound of the formula (III) while adjusting the pH to 5 to 12, preferably 6 to 10 at a temperature of −10° to 50° C., preferably 0° to 20° C., thereby to obtain the monoazo compound of the formula (IV). Alternatively, the compound (IV) may also be obtained by carrying out coupling in the same manner as above using the N-acylated product of the compound (III), and then hydrolyzing the resulting compound at 50° to 100° C. in the presence of an acid or alkali to split the acyl group.

Subsequently, the compound (IV) is subjected to first-step condensation with cyanuric chloride in an aqueous medium while adjusting the pH to 2 to 10, preferably 3 to 7 at a temperature of −10° to 50° C., preferably 0° to 30° C., thereby to obtain a dichlorotriazinyl compound, and this compound is then subjected to second-step condensation with the compound of the formula (V) while adjusting the pH to 2 to 9, preferably 4 to 6 at a temperature of 0° to 70° C., preferably 30° to 50° C., thereby to obtain the compound of the formula (I).

(2) The compound (I) may also be obtained by subjecting the compound (V) to first-step condensation with cyanuric chloride in an aqueous medium while adjusting the pH to 1 to 8, preferably 2 to 6 at a temperature of −10° to 40° C., preferably 0° to 20° C., and then subjecting the resulting compound to second-step condensation with the compound (IV) while adjusting the pH to 2 to 9, preferably 4 to 6 at a temperature of 0° to 70° C., preferably 20° to 50° C.

(3) Cyanuric chloride is condensed with the compounds (III) and (V) in optional order in two steps in an aqueous medium while adjusting the pH to 1 to 8 at −10° to 40° C. for the first-step condensation and the pH to 2 to 9 at 0° to 70° C. for the second-step condensation, thereby to obtain a monochlorotriazinyl compound of the formula (VI), and this compound is then coupled with the diazonium salt of the aromatic amine (II) while adjusting the pH to 4 to 10, preferably 5 to 9 at a temperature of −10° to 50° C., preferably 0° to 20° C., thereby to obtain the compound (I).

(4) The compound (I) may also be obtained by subjecting the compound (III) to first-step condensation with cyanuric chloride in an aqueous medium while adjusting the pH to 1 to 8, preferably 2 to 5 at a temperature of −10° to 40° C. preferably 0° to 20° C., coupling the resulting compound with the diazonium salt of the aromatic amine (II) while adjusting the pH to 4 to 10, preferably 5 to 9 at a temperature of −10° to 50° C., preferably 0° to 20° C., thereby to obtain the monoazo compound of the formula (VII), and then subjecting the compound (VII) to second-step condensation with the compound (V) while adjusting the pH to 2 to 9, preferably, 4 to 6 at a temperature of 0° to 70° C., preferably 30° to 50° C.

(5) and (6) The dye (I) may also be obtained by carrying out the above procedures using a compound of the formula (VIII) in place of the compound (V), followed by final esterification with an acid of 2 to 10 mole ratio at a temperature of 0° to 30° C. or further treatment with an alkali while adjusting the pH to 8 to 10 at 20° to 50° C.

The present compound of the formula (I) can be used for dyeing cellulose fiber materials in an orange to scarlet color of deep hue by a conventional dyeing method such as exhaustion dyeing, printing and continuous dyeing including a cold-pad-batch method.

Examples of cellulose fiber materials which can be dyed in accordance with the present invention are natural or regenerated cellulosic fibers such as cotton, flax, viscose rayon, viscose staple and the like.

Exhaustion dyeing can be carried out at relatively low temperatures using a dyeing bath containing sodium sulfate or sodium chloride and an acid-binding agent such as sodium carbonate, sodium tertiary phosphate or sodium hydroxide. Printing can be carried out by using a print paste containing an acid-binding agent (e.g. sodium hydrogen carbonate, sodium carbonate, sodium tertiary phosphate, sodium hydroxide), urea and a thickening agent such as preferably sodium alginate, and the printing is followed by intermediate drying and steaming or dry heating at 100° to 200° C. Further, the dyeing of the present invention may be carried out by a continuous process such as a cold-pad-batch process.

The dyes of the formula (I) of the present invention have good build-up properties and produce dyed products superior in chlorine fastness (3–4 grade, ISO standard) and perspiration-light fastness. Particularly, considering that fading of dyed products due to trace amounts of active chlorine in city water frequently becomes a problem on washing at home, the dyes of the present invention, which are superior in chlorine fastness, are very valuable. Also, as to perspiration-light fastness, which has recently become an important criteria due to an increase in the demand for sportswear, the grade of fastness exhibited by the present dyes is as high as 3 to 4 grade, which means that the value of the dyes is high in this respect also.

Further, products dyed with the conventional reactive dyes are affected by acid gases in the air so as to lower fastnesses with the lapse of time. However, in accordance with the present invention, this drawback can be overcome. That is, the acid stability of dyed products obtained with the dyes of the present invention, as tested and described below, is as good as 4–5 to 5 grade: Dyed cloth is dipped in 1% acetic acid for 30 minutes and treated at 37 ±2° C. for 6 hours under pressure of 125 g/cm² on a perspirometer. The dyes of the present invention are also of high value in this respect.

Further, the present dyes have the following significant advantages: The alkali stability is good enough to show a high percentage exhaustion and a high percentage fixation in exhaustion dyeing as well as a high percentage fixation in printing, and therefore dyed products of deep hue can be obtained. In addition, the present dyes are superior in washing-off property.

In exhaustion dyeing, the dyes of the present invention are not significantly affected by variations in dyeing temperature, alkali agent, amount of inorganic salt and liquor ratio, so that they have as a unique and quite valuable characteristic the fact that dyeing can be carried out with very high reproducibility.

The present invention will be illustrated with reference to the following examples, which are not however to be interpreted as limiting the invention thereto. Parts and % are by weight.

EXAMPLE 1

Cyanuric chloride (b 9.2 parts) is dispersed at 0° to 5° C. in a solution of a nonionic surfactant (0.1 part) in water (100 parts), and a solution of J acid (11.3 parts) in water (100 parts) produced at a pH of 7 to 8 is added dropwise at 0° to 5° C. over 1 hour. After completion of the addition, the mixture is adjusted to a pH of 3 with 20% aqueous sodium carbonate solution, followed by stirring for 2 hours. Thereafter, the sulfuric ester of 1-N-ethylaminobenzene-3-β-hydroxyethylsulfone (16 parts) added, and the mixture is heated to 40° C. while adjusting the pH to 5 to 6 with 20% aqueous sodium carbonate solution, followed by stirring at the same temperature for 5 hours.

The reaction solution is then cooled again to 0° to 5° C., and sodium hydrogen carbonate (12.6 parts) is added. A liquor prepared by diazotizing 2-aminonaphthalene-1,5-disulfonic acid (15 parts) in a conventional manner is added to the above reaction solution at 0° to 5° C. over 1 hour, and the mixture is stirred at the same temperature for 2 hours. The pH of the reaction solution is adjusted to 5 to 6 with hydrochloric acid, and sodium chloride (40 parts) is added to deposit crystals which are then collected on a suction-filter, washed and dried at 60° C. to obtain a dye of the formula (I),

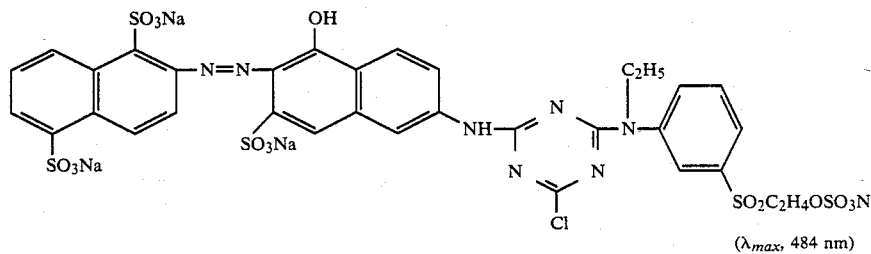

($\lambda_{max}$, 484 nm)

The dye (1) may also be synthesized by the following method: The same procedure as above is repeated, except that 1-N-ethylaminobenzene-3-β-hydroxyethylsulfone (11.4 parts) is used in place of the sulfuric ester of 1-N-ethylaminobenzene-3-β-hydroxyethylsulfone. The resulting compound is added to 100% sulfuric acid (500 parts) at 5° to 20° C. over 2 hours, followed by stirring at the same temperature for 3 hours. The reaction solution is then gradually discharged into ice (1200 parts), and deposited crystals are collected by filtration. The crystals are then dispersed in water (400 parts) and dissolved by adjusting the pH to 5 to 6 with sodium carbonate. Sodium chloride (60 parts) is added to redeposit crystals, which are then collected on a suction-filter, washed and dried at 60° C.

The dye (1) (0.3 part) is dissolved in water (200 parts), and after adding sodium sulfate (20 parts) and then cotton (10 parts), the temperature is raised to 50° C. 30 Minutes thereafter, sodium carbonate (4 parts) is added, and dyeing is carried out at the same temperature for 1 hour. After completion of the dyeing, the dyed cotton is washed with water and soaped to obtain a orange dyed product superior in chlorine fastness.

In the same manner as above, dyes producing dyed products of deep orange to scarlet color superior in chlorine fastness are obtained using the following compounds.

| Run No. | (II) ![compound II with NH2 and (SO3H)m] | Compounds of formula (III) Z | R₁ | (V) R₂ / HN—A—X |
|---|---|---|---|---|
| (2) | 2-aminonaphthalene with SO₃H at 1-position | SO₃H | H | HN(C₂H₅)—C₆H₄—SO₂C₂H₄OSO₃H |
| (3) | 2-aminonaphthalene with SO₃H at 1-position | H | C₂H₅ | HN(C₃H₇)—C₆H₄—SO₂C₂H₄OSO₃H |
| (4) | 2-amino-1,5-naphthalenedisulfonic acid | H | H | HN(C₂H₅)—C₆H₄—SO₂C₂H₄OSO₃H |
| (5) | 3-amino-2,7-naphthalenedisulfonic acid (NH₂ with SO₃H groups) | H | H | HN(CH₃)—C₆H₄—SO₂C₂H₄OSO₃H |
| (6) | 2-amino-3,6,8-naphthalenetrisulfonic acid | H | H | HN(CH₃)—C₆H₃(CH₃)—SO₂CH=CH₂ |

EXAMPLE 2

Cyanuric chloride (9.2 parts) is dispersed at 0° to 5° C. in a solution of a nonionic surfactant (0.1 part) in water (100 parts), and a solution containing 2-amino-5-hydroxynaphthalene-6-(1-sulfo-2-naphthylazo)-1,7-disulfonic acid, as synthesized from the diazonium salt of 2-aminonaphthalene-1-sulfonic acid (11 parts) and 2-amino-5-hydroxynaphthalene-1,7-disulfonic acid (16 parts), is added dropwise to the above dispersion over 1 hour while maintaining the pH at 4 to 5 with 20% aqueous sodium carbonate solution. The mixture is then stirred at 0° to 10° C. for 2 hours. Thereafter, the sulfuric ester of 1-N-methylaminobenzene-3-β-hydroxyethylsulfone (15 parts) is added, and the temperature is raised to 50° C. while adjusting the pH to 5 to 6 with 20% aqueous sodium carbonate solution, and the mixture is stirred at the same temperature for 6 hours. Sodium chloride (40 parts) is added to deposit crystals which are then collected on a suction-filter, washed and dried at 60° C. to obtain a dye of the formula (7),

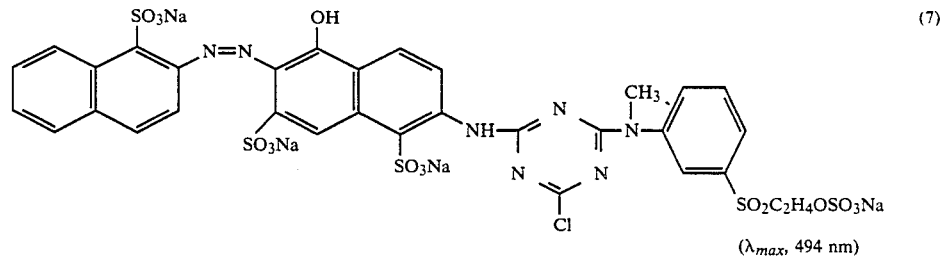

($\lambda_{max}$, 494 nm)

The dye (7) (0.3 part) is dissolved in water (150 parts), and after adding sodium sulfate (30 parts) and then cotton (10 parts), the temperature of the bath is raised to 60° C. 20 Minutes thereafter, sodium carbonate (4 parts) is added, and dyeing is carried out at the same temperature for 1 hour. After completion of the dyeing, the dyed cotton is washed with water and soaped to obtain a dyed product of deep orange color superior in chlorine fastness.

In the same manner as above, dyes producing dyed products of deep orange to scarlet color superior in chlorine fastness are obtained using the following compounds.

prepared by diazotizing 2-aminonaphthalene-1-sulfonic acid (11 parts) in a conventional manner is added to the mixture at 0° to 5° C. over 1 hour, and the mixture is followed by stirring at the same temperature for 2 hours. After adjusting the pH of the mixture to 5 to 6 with hydrochloric acid, the sulfuric ester of 1-N-hydroxyethylaminobenzene-3-β-hydroxyethylsulfone (16 parts) is added. The temperature is then raised to 40° C. while adjusting the pH to 5 to 6 with 20% aqueous sodium carbonate solution, and the mixture is followed by stirring at the same temperature for 6 hours. Sodium chloride (40 parts) is added to deposit crystals, which were then collected on a suction-filter, washed and dried at 60° C. to obtain a dye of the formula (12),

| Run No. | (II) (SO₃H)ₘ | Compounds of the formula (III) Z | R₁ | (V) R₂ HN—A—X |
|---|---|---|---|---|
| (8) | 2-amino-naphthalene-1-sulfonic acid | SO₃H | H | C₂H₅ HN—C₆H₄—SO₂C₂H₄OSO₃Na |
| (9) | 2-amino-naphthalene-1,5-disulfonic acid | H | H | CH₃ HN—C₆H₄—SO₂C₂H₄OPO₃H₂ |
| (10) | 3-amino-naphthalene-2,6-disulfonic acid | H | H | CH(CH₃)₂ HN—C₆H₃(OCH₃)—SO₂C₂H₄OSO₃H |
| (11) | 3-amino-naphthalene-2,6-disulfonic acid | H | H | C₂H₅ HN—naphthyl—SO₂C₂H₄OSO₃H |

EXAMPLE 3

Cyanuric chloride (9.2 parts) is dispersed at 0° to 5° C. in a solution of a nonionic surfactant (0.1 part) in water (100 parts), and a solution of 2-amino-5-hydroxynaphthalene-1,7-disulfonic acid (16 parts) in water (200 parts) produced at a pH of 7 to 8 is added dropwise to the above dispersion at 0° to 5° C. over 1 hour. After completion of the addition, the mixture is adjusted to a pH of 3 with 20% aqueous sodium carbonate solution, followed by stirring for 2 hours. Sodium hydrogen carbonate (14 parts) is then added. Thereafter, a liquor

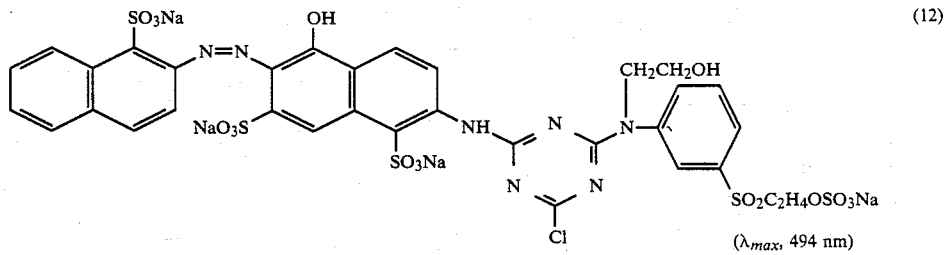

($\lambda_{max}$, 494 nm)

The dye (12) (0.3 part) is dissolved in water (300 parts), and after adding sodium sulfate (30 parts) and then cotton (10 parts), the temperature of the bath is raised to 60° C. 20 Minutes thereafter, sodium carbonate (5 parts) is added, and dyeing is carried out at the same temperature for 1 hour. After completion of the dyeing, the dyed cotton is washed with water and soaped to obtain a dyed product of deep orange color superior in chlorine fastness.

In the same manner as above, dyes producing dyed products of deep orange to scarlet color superior in chlorine fastness are obtained using the following compounds.

$\beta$-hydroxyethylsulfone (14 parts) in water (100 parts) at a pH of 4 to 5, is added dropwise to the above dispersion at 0° to 5° C. over 1 hour. After completion of the addition, the mixture is adjusted to a pH of 3 with 20% aqueous sodium carbonate solution, followed by stirring for 2 hours. Thereafter, J acid (11.3 parts) is added thereto, and the temperature is raised to 40° C. while adjusting the pH to 5 to 6 with 20% aqueous sodium carbonate solution, and the mixture is followed by stirring at the same temperature for 2 hours. The reaction solution is then cooled again to 0° to 5° C., and sodium

| Run No. | (II) naphthalene-NH₂ (SO₃H)ₘ | Compounds of the formula (III) Z | R₁ | (V) HN—A—X with R₂ |
|---|---|---|---|---|
| (13) | 2-naphthyl-NH₂ with 1-SO₃H | SO₃H | H | CH₂OH on HN—phenyl—SO₂C₂H₄OSO₃H |
| (14) | 2-naphthyl-NH₂ with 1-SO₃H | H | CH₃ | CH₂CH₂COOH on HN—phenyl(OCH₃)—SO₂C₂H₄OSO₃H |
| (15) | 2-naphthyl-NH₂ with 1-SO₃H | H | H | CH₂SO₃H on HN—phenyl(OCH₃)—SO₂C₂H₄OSO₃H |
| (16) | 2-amino-naphthalene-1,7-disulfonic (HO₃S, SO₃H) | H | H | CH₂CH₂Cl on HN—phenyl—SO₂C₂H₄OSO₃H |
| (17) | 3-amino-naphthalene with 2-SO₃H and 6-SO₃H | H | H | CH₂CH₂COOCH₃ on HN—phenyl(CH₃)—SO₂C₂H₄OSO₃H |
| (18) | 3-amino-naphthalene with 2-SO₃H and 6-SO₃H | H | H | CH₂CH(OH)CH₃ on HN—phenyl—SO₂CH=CH₂ |

EXAMPLE 4

Cyanuric chloride (9.2 parts) is dispersed at 0° to 5° C. in a solution of a nonionic surfactant (0.1 part) in water (100 parts), and a solution obtained by dissolving the sulfuric ester of 1-N-hydroxyethylaminobenzene-3- hydrogen carbonate (12.6 parts) is added thereto. A liquor prepared by diaotizing 2-aminonaphthalene-1,5-disulfonic acid (15 parts) in a conventional manner is added at 0° to 5° C. over 1 hour. After stirring at the same temperature for 2 hours, the pH is adjusted to 5 to 6 with hydrochloric acid. Sodium chloride (60 parts) is then added to deposit crystals, which are then collected on a suction-filter, washed and dried at 60° C. to obtain a dye of the formula (19),

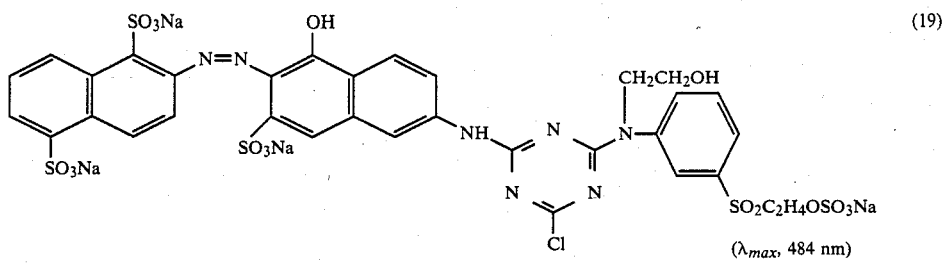

The dye (19) (0.3 part) is dissolved in water (200 parts), and after adding sodium sulfate (30 parts) and then cotton (10 parts), the temperature is raised to 50° C. 30 Minutes thereafter, sodium tertiary phosphate (4 parts) is added, and dyeing is carried out at the same temperature for 1 hour. After completion of the dyeing, the dyed cotton is washed with water and soaped to obtain a dyed product of deep orange color superior in chlorine fastness.

In the same manner as above, dyes producing dyed products of deep orange to scarlet color superior in chlorine fastness are obtained using the following compounds.

EXAMPLE 5

| Composition of print paste: | Parts |
|---|---|
| Dye (1) | 5 |
| Urea | 5 |
| Sodium alginate stock thickening (5%) | 55 |
| Hot water | 33 |
| Sodium hydrogen carbonate | 2 |

The print paste of the above composition is printed on mercerized cotton broad, and after intermediate drying, the cotton broad is steamed at 100° C. for 5 minutes, hot rinsed, soaped, hot rinsed and dried. Thus, an orange printed product superior in chlorine fastness is obtained.

| Run No. | (II) $(SO_3H)_m$ | Compounds of the formula (III) Z | $R_1$ | (V) $HN(R_2)-A-X$ |
|---|---|---|---|---|
| (20) | 1-SO₃H, 2-NH₂ naphthalene | SO₃H | H | $R_2$=CH₂CH₂OH; HN-C₆H₃(OCH₃)-SO₂C₂H₄OSO₃H |
| (21) | 1-SO₃H, 2-NH₂ naphthalene | H | C₂H₅ | $R_2$=CH₂CH₂OH; HN-C₆H₄-SO₂C₂H₄OCOCH₃ |
| (22) | 1-SO₃H, 2-NH₂, 5-SO₃H naphthalene | H | H | $R_2$=CH₂CHCH₂CH₃ with OH; HN-C₆H₄-SO₂C₂H₄OSO₃H |
| (23) | 2-NH₂, 3-SO₃H, 6-SO₃H naphthalene | H | H | $R_2$=CH₂CH₂OCH₃; HN-C₆H₄-SO₂CH=CH₂ |

EXAMPLE 6

| Composition of print paste: | Parts |
|---|---|
| Dye (19) | 4 |
| Urea | 5 |
| Sodium alginate stock thickening (5%) | 60 |
| Hot water | 29 |
| Sodium hydrogen carbonate | 2 |

The print paste of the above composition is printed on mercerized cotton broad, and after intermediate drying, the cotton broad is steamed at 120° C. for 5 minutes, hot rinsed, soaped, hot rinsed and dried. Thus, an orange printed product superior in chlorine fastness is obtained.

What is claimed is:

1. A compound represented by a free acid of the formula,

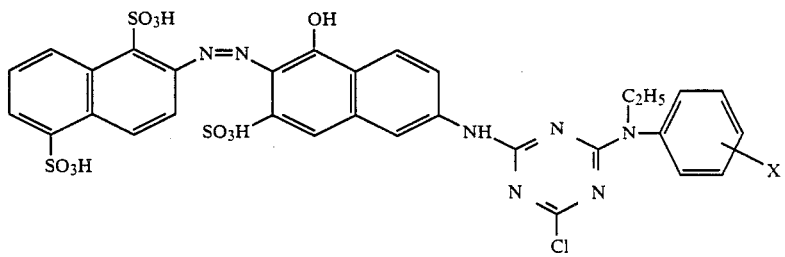

-continued

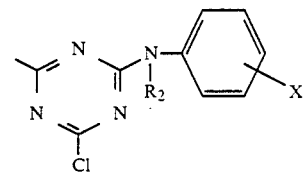

wherein $R_2$ is alkyl having 1 to 4 carbons and is unsubstituted; Z is hydrogen or sulfonic acid; n is 0 or 1; and X is —SO$_2$CH=CH$_2$ or —SO$_2$CH$_2$CH$_2$Y in which Y is a group that is splittable by alkalis.

2. A compound represented by a free acid of the formula,

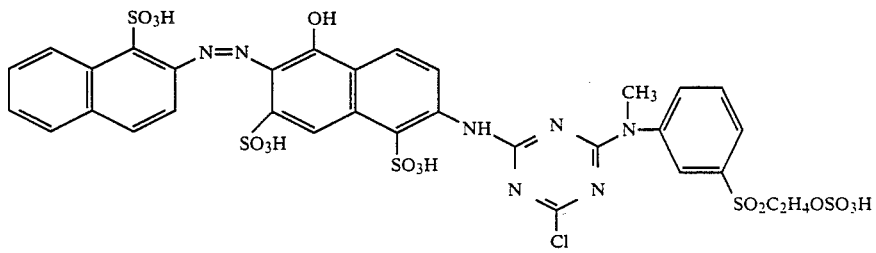

wherein X is —SO$_2$CH=CH$_2$ or —SO$_2$CH$_2$CH$_2$Y in which Y is a group that is splittable by alkalis.

3. A compound represented by a free acid of the formula,

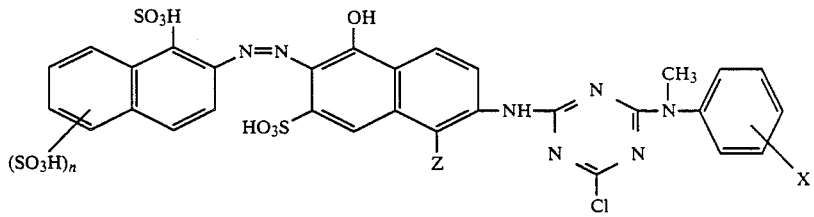

4. A compound represented by a free acid of the formula,

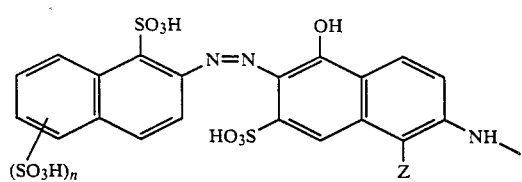

wherein Z is hydrogen or sulfonic acid; n is 0 or 1; and X is —SO$_2$CH=CH$_2$ or —SO$_2$CH$_2$CH$_2$Y, in which Y is a group that is splittable by alkalis.

5. A compound represented by a free acid of the formula,

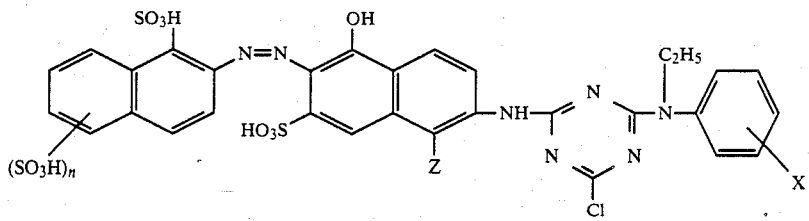
wherein Z is hydrogen or sulfonic acid; n is 0 or 1; and X is —SO$_2$CH=CH$_2$ or —SO$_2$CH$_2$CH$_2$Y, in which Y is a group that is splittable by alkalis.
6. A compound represented by a free acid of the formula,
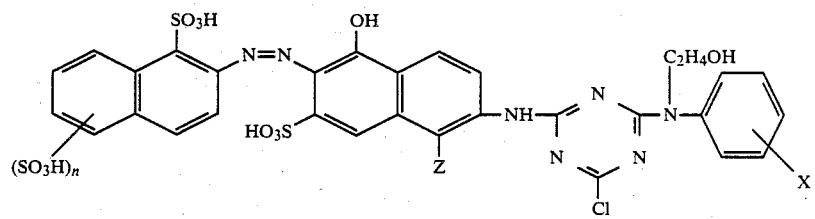
wherein Z is hydrogen or sulfonic acid; n is 0 or 1; and X is —SO$_2$CH=CH$_2$ or —SO$_2$CH$_2$CH$_2$Y, in which Y is a group that is splittable by alkalis.
* * * * *